United States Patent
Jefferies et al.

(10) Patent No.: US 12,512,996 B2
(45) Date of Patent: Dec. 30, 2025

(54) SECURE PASSWORD RESET SYSTEM AND METHOD

(71) Applicant: Schneider Electric USA, Inc., Andover, MA (US)

(72) Inventors: Kevin M. Jefferies, Raleigh, NC (US); Benjamin W. Edwards, Andover, MA (US); Alan E. Freeman, Raleigh, NC (US); Matthew L. White, Cary, NC (US)

(73) Assignee: Schneider Electric USA, Inc., Boston, MA (US)

( * ) Notice: Subject to any disclaimer, the term of this patent is extended or adjusted under 35 U.S.C. 154(b) by 8 days.

(21) Appl. No.: 18/227,427

(22) Filed: Jul. 28, 2023

(65) Prior Publication Data
US 2025/0038985 A1 Jan. 30, 2025

(51) Int. Cl.
*G06F 21/31* (2013.01)
*G06F 21/36* (2013.01)
(Continued)

(52) U.S. Cl.
CPC ............ *H04L 9/3228* (2013.01); *G06F 21/31* (2013.01); *H04L 63/083* (2013.01); *G06F 21/36* (2013.01);
(Continued)

(58) Field of Classification Search
CPC ... H04L 9/3228; H04L 63/083; H04L 63/102; G06F 21/31; G06F 21/36; G06F 2221/2131
See application file for complete search history.

(56) References Cited

U.S. PATENT DOCUMENTS 10,649,414 B2   5/2020  Sangi
10,826,875 B1  11/2020  Kim
(Continued)

FOREIGN PATENT DOCUMENTS

| EP | 292457 A1 | 11/1988 |
| EP | 2924574 B1 | 1/2019 |
| WO | 2020167222 A2 | 8/2020 |

OTHER PUBLICATIONS

C. Huang, "An Integrated Mechanism for Resetting Passwords in Web Applications," 2017 International Conference on Computational Science and Computational Intelligence (CSCI), Las Vegas, NV, USA, 2017, pp. 50-54, doi: 10.1109/CSCI.2017.9. (Year: 2017).*

(Continued)

*Primary Examiner* — Robert B Leung
(74) *Attorney, Agent, or Firm* — Wolf, Greenfield & Sacks, P.C.

(57) ABSTRACT

A method of resetting a password used for accessing a product device is provided, including receiving a password reset request from a user to reset a password for accessing the product device, the user having a prior registration to access the product device, generating a temporary password that uses information that is unique for each of the product device and the user and is signed using a cryptographic technique, and providing the signed password to the user for submission to and verification by the product device. The product device is configured to verify the signed temporary password using the cryptographic technique and using information that is unique for each of the product device and the user and that is known to the product device, and to allow the user access to the product device pending verification.

19 Claims, 5 Drawing Sheets

(51) Int. Cl.
  *H04L 9/32*       (2006.01)
  *H04L 9/40*       (2022.01)
(52) U.S. Cl.
  CPC .... *G06F 2221/2131* (2013.01); *H04L 63/102* (2013.01)

(56) References Cited

U.S. PATENT DOCUMENTS

| | | | |
|---|---|---|---|
| 11,632,362 B1* | 4/2023 | Woodward | H04L 9/3234 |
| | | | 713/171 |
| 2006/0036868 A1* | 2/2006 | Cicchitto | H04L 63/08 |
| | | | 713/182 |
| 2013/0198824 A1* | 8/2013 | Hitchcock | H04L 63/102 |
| | | | 726/5 |
| 2016/0352702 A1* | 12/2016 | Gallant | G06F 21/31 |
| 2019/0280876 A1* | 9/2019 | Eidenschink | H04L 63/123 |

OTHER PUBLICATIONS

D. Wang, "Resetting Your Password Is Vulnerable: A Security Study of Common SMS-Based Authentication in IoT Device," Wireless Communications and Mobile Computing, 2018, 7849065, 15 pages, 2018. (Year: 2018).*

* cited by examiner

SECURE PASSWORD RESET SYSTEM AND METHOD

TECHNICAL FIELD

The present disclosure relates to password protected product devices, and more particularly to a system and method for securely resetting passwords of password protected product devices.

BACKGROUND

A smart product device is frequently password protected to limit access to the product device to permitted users having the password. There are various scenarios in which a permitted user of the product device has a need to reset the password, including obtaining a new password to replace an existing password. Some, albeit not exhaustive, scenarios in which a password reset could be needed include a permitted user forgetting a password. In another scenario, the password to the product device may have been compromised and changed by a non-permitted user. In still another scenario, the product device may be situated in a shared environment, such as a work environment, in which a new user can be added to the permitted users or replace one or more of the permitted users, but may not have been provided with the password. In still another scenario, the product device may need to be accessed by a temporary user to do dedicated maintenance, but this user does not have an account set up on the device, nor does the owner of the device want to give the user permanent credentials.

If the password cannot be recovered, the product device may be rendered inaccessible to any user, also known as "bricked."

One solution that has been used is to hard-code a recovery mechanism on the product device. However, this hard-coded recovery mechanism could potentially be discovered by a non-permitted user. Furthermore, hard-code recovery mechanisms are not allowed for certain types of product devices, such as product devices that operate in an industrial setting that must comply with a security policy based on high security standards. Some product devices are provided with a backdoor that can be used to reset the password. However, this too is vulnerable to discovery or misuse by a non-permitted user and may not comply with a security policy.

Another solution is to provide the product device with reduced functionality when a password is not entered. However, there is a need for a permitted user to recover full functionality of the product device.

Solutions have been developed that use the Internet to implement a reset or recovery mechanism. However, this may be unhelpful for product devices that are not or cannot (e.g., for compliance with a security policy) be connected to the Internet.

While conventional methods and systems have generally been considered satisfactory for their intended purpose, there is still a need in the art for a system and method to perform password reset or recovery or to provide a temporary password for one-time use in a secure fashion that does not need Internet access.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, disclosed is a method performed by a server for resetting a password used for accessing a product device. The method includes receiving a password reset request from a user to reset a password for accessing the product device, the user having a prior registration to access the product device; generating a temporary password that uses information that is unique for each of the product device and the user and is signed using a cryptographic technique; and providing the signed password to the user for submission to and verification by the product device, wherein the product device is configured to verify the signed temporary password using the cryptographic technique and using information that is unique for each of the product device and the user and that is known to the product device, and to allow the user access to the product device pending verification.

In accordance with one or more embodiments, the method generating the signature can be conditional upon receiving additional information, wherein the additional information can establish that the user has physical access to the product device, the additional information can include data related to the product device that is currently digitally unavailable to the product device, the additional information can include data related to the product device that is currently digitally unavailable to the product device other than for temporary display, the additional information can include data related to the product device that is controlled by the manufacturer, and/or the additional information can be set to expire within a predetermined time period.

In accordance with one or more embodiments, the method can further include obtaining and storing the information that is unique to the product device and the information that is unique to the user during the prior registration and accessing the stored information that is unique to the product device and the information that is unique to the user using data in the password reset request that identifies the user and the product device.

In accordance with one or more embodiments, the method can further include coupling to a network and automatically registering the product device when it is coupled to a component that is connected to the network.

In accordance with one or more embodiments, the product device can be an industrial device.

In accordance with one or more embodiments, wherein the product device can be inaccessible via a public network or access to the public network requires bridging an air gap.

In accordance with another aspect of the disclosure a method performed by a product device for resetting a password for accessing the product device is provided. The method includes storing a cryptographic key, information that is unique for the product device, and information unique to one or more respective users registered by a registration process as being authorized to access the product device and receiving a signed password from a user. The signed password was created using information that is unique for each of the product device and the user and signed using a cryptographic technique. The method further includes attempting to verify the signed password using the stored cryptographic key, the stored information that is unique for the product device, and the stored information unique to the one or more respective users. The method further includes allowing the user to access to the product device pending verification.

In accordance with one or more embodiments, the method can further include coupling to a component that is coupled to a network and providing registration information that includes information that is unique for the product device to the component for registering the product device using the registration process.

In accordance with one or more embodiments, the product device can be an industrial device.

In accordance with one or more embodiments, wherein the product device can be inaccessible via a public network or access to the public network requires bridging an air gap.

In accordance with one or more embodiments, attempting to verify the signed password and/or allowing the user access to the product device can be performed conditionally upon the product device being in a predefined state.

In accordance with one or more embodiments, the signed password can be provided conditional upon verification of additional information, wherein the additional information can establish that the user has physical access to the product device, the product device is unable to access the additional information at all, the product device is unable to access the additional information other than for temporary display, and/or the additional information is set to expire within a predetermined time period.

In accordance with another aspect of the disclosure a server is provided. The server includes at least one memory configured to store instructions and at least one processor disposed in communication with the at least one memory. The at least one processor upon execution of the instructions is configured to perform the operations of the method performed by the server for resetting a password used for accessing a product device.

In accordance with another aspect of the disclosure a product device is provided. The server includes at least one memory configured to store instructions and at least one processor disposed in communication with the at least one memory. The at least one processor upon execution of the instructions is configured to perform the operations of the method performed by the product device for resetting a password used for accessing the product device. In accordance with still another aspect of the disclosure, one or more non-transitory computer readable storage mediums and one or more computer programs embedded therein are provided. The computer programs include instructions, which when executed by a computer system, cause the computer system to perform the operations of the method performed by the server for resetting a password used for accessing a product device.

In accordance with still another aspect of the disclosure, one or more non-transitory computer readable storage mediums and one or more computer programs embedded therein are provided. The computer programs include instructions, which when executed by a computer system, cause the computer system to perform the operations of the method performed by the product device for resetting a password used for accessing the product device.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

DETAILED DESCRIPTION

Figure 1:
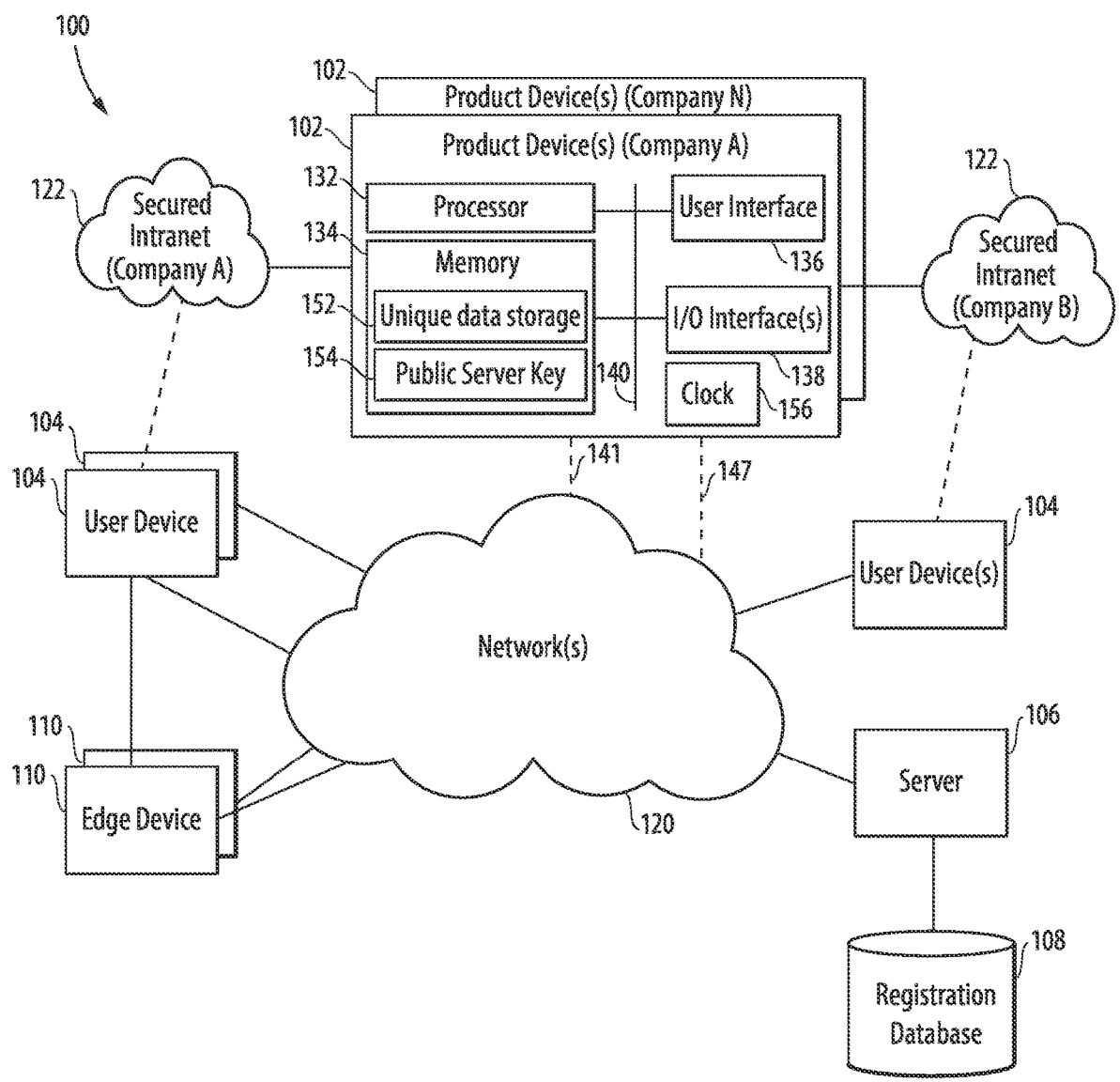
FIG. 1 is a block diagram illustrating an example password reset system, in accordance with one or more embodiments of the disclosure.

Reference will now be made to the drawings wherein like reference numerals identify similar structural features or aspects of the subject disclosure. For purposes of explanation and illustration, and not limitation, a block diagram of an exemplary embodiment of a password reset system in accordance with the disclosure is shown in FIG. 1 and is designated generally by reference character 100. Other embodiments of the password reset system 100 in accordance with the disclosure, or aspects thereof, are provided in FIGS. 2-5, as will be described.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. It is to be appreciated the embodiments of this disclosure as discussed below are implemented using a software algorithm, program, or code that can reside on a computer useable medium for enabling execution on a machine having a computer processor. The machine can include memory storage configured to provide output from execution of the computer algorithm or program.

As used herein, the term "software" is meant to be synonymous with any logic, code, or program that can be executed by a processor of a host computer, regardless of whether the implementation is in hardware, firmware or as a software computer product available on a disc, a memory storage device, or for download from a remote machine. The embodiments described herein include such software to implement the equations, relationships, and algorithms described above. One skilled in the art will appreciate further features and advantages of the disclosure based on the above-described embodiments. Accordingly, the disclosure is not to be limited by what has been particularly shown and described, except as indicated by the appended claims.

The disclosure provides a method and system for securely resetting the password used to access a product device by creating a temporary password that uses information unique to the product device and a user of the product device and transmitting the temporary password after it is signed using a cryptographic technique to the user for submission to the product device. The particular device is configured to verify the signed temporary password using the cryptographic technique and using information that is known to the particular device and to allow the user access to the particular device pending verification (which in effect resets the password temporarily to the temporary password) and/or to allow the user to reset a password of the product device to a new password. The information that is known to the particular device includes the information that is unique for each of the particular device and the user, provided the user is registered with the product device. The process can be performed without any hard-coded methods to recover a forgotten password, without using any backdoors to access the product device, and without losing access to functionality of the product device. Additional security measures can be used, such as requiring proof of physical access to the product device before generating the temporary password.

Description of certain illustrated embodiments of the present disclosure will now be provided. With reference now to FIG. 1, password reset system 100 includes one or more product devices 102, one or more user devices 104, and a server 106. Server 106 accesses a registration database 108. User device(s) 104 and server 106 can communicate via one or more networks 120. Network(s) 120 can include an enterprise network and/or a public network, such as the Internet. Communications between the components shown in FIG. 1 can use wired and/or wireless datalinks. The number of each of the components shown in FIG. 1 is for illustration purposes only, and is not intended as a limitation.

In one or more embodiments, such as when product device 102 is governed by a security policy, product device 102 can be isolated from network(s) 120. In one or more embodiments, as indicated by dotted lines 141, product device 102 can communicate with user device 102 and/or server 106 via network(s) 120, such as when the security policy is lax or special measures are taken that comply with the security policy.

Product device(s) 102 are each a smart device having at least one processing device that can perform one or more functions. Product device 102 can include, for example, an industrial device, such as a sensor, actuator, edge device, controller, server, etc.

In one or more embodiments, product device 102 is not limited to use in a particular application, and can be used in one or more different environments, including, for example and without limitation, industrial, autonomous transportation, commercial, communication, network security, healthcare, etc. For example, product device 102 can include, for example, a smart phone, a computing device, sensor, actuator, edge device controller, server, etc. in a variety of environments.

Product device(s) 102 can be coupled to a secured intranet 122, such as an enterprise network used by computing devices that belong to the same enterprise. The enterprise network can be, for example, an industrial network that provides a communication framework for one or more product devices 102 that belong to the same enterprise. The industrial network can service, for example, one or more manufacturing plants, one or more energy (e.g., nuclear energy, oil refinery, etc.) production plants, or one or more chemical processing plants, for example, for a particular company. Enterprises Company 1 and Company N are shown, each having a secured intranet 122 with one or more user devices 102 and one or more edge devices 104, without limitation to any particular number or configuration of enterprises.

Security policies for the secured intranet 122 can specify that the secured intranet 122 have an air gap that buffers or cuts-off the product device(s) 102 coupled to the secured intranet 122 from a public network, such as the Internet. An air gap can be implemented, for example, by a firewall on each side of the air gap. Any communication between the product device(s) 102 with server 106 or user device(s) 104 are performed in a way to bridge the air gap for that particular communication while maintaining the existence of the air gap. Methods to bridge the air gap while maintaining the air gap exist and are outside the scope of the disclosure.

Figure 5:
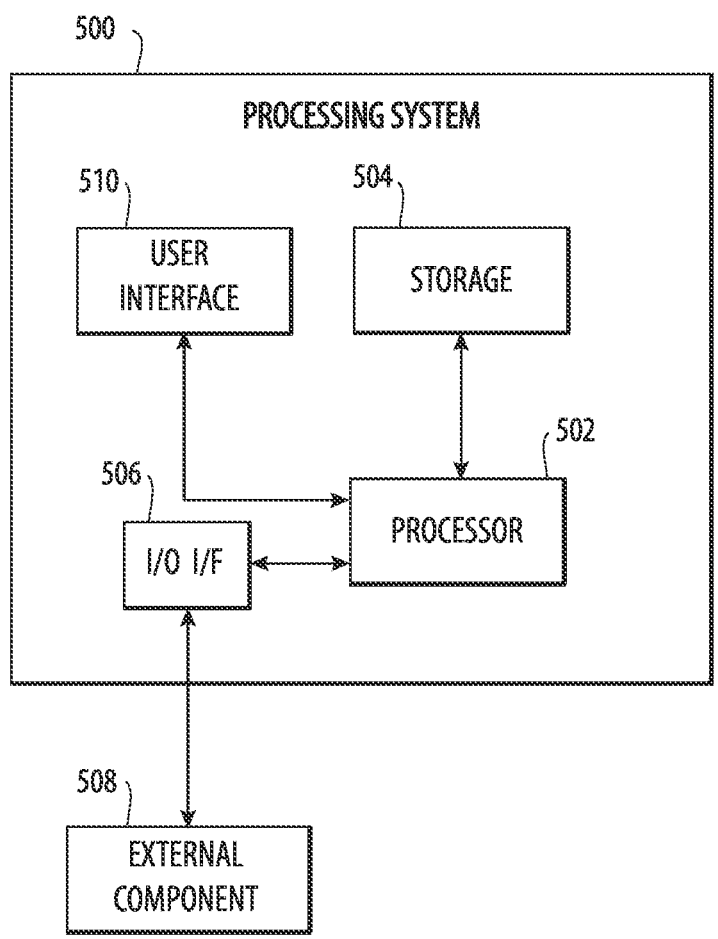
FIG. 5 is a block diagram of an example computer system used for implementation of each of a user device, server, and product device shown in FIG. 1, in accordance with one or more embodiments of the disclosure.

Each product device 102 includes a processor 132, a memory 134 and a user interface 136 and/or an I/O interface 138 coupled by a bus 140, as described in greater detail with respect to corresponding components of FIG. 5. Memory 134 includes a unique data storage portion 152 for storage of product-unique data and public server key 154. The product unique data can include unique product data about product device 102 and unique user data about one or more users or user devices 104 authorized to use and previously registered with product device 102. The public server key 154 and product-unique data can be entered at the time of manufacturing or afterwards, such as before or after installation at an operating site. Provision of the public server key 154 and product-unique data can be performed by an authorized user via the user device and/or via another processing device via I/O interface 208.

It is noted that public server key 154 is disclosed in this example as being public, but this does not refer to a requirement that public server key 154 be distributed or otherwise made known to others. Public server key 154 can be a non-private key. In this way, it is possible to store public server key 154 in memory 134 without the need to provide specific protections to memory 134 for protection of public server key 154. For example, a need to encrypt public server key 154 in hardware of product device 102, including memory 134, can be avoided.

User interface 136 and/or an I/O interface 138 can further accept information from a user, namely a signed temporary password. Product device 102 is configured to verify an entered signed temporary password based on the stored public server key 154 and a combination of the product-unique data. Product device 102 is configured to allow a current password to be reset, which includes temporarily resetting the current password to the temporary password (which allows the user to logon to the product device 102 to obtain temporary access to product device 102 and/or to allow the user to reset the current password to a new password). The temporary access can include operations allowed with a temporary logon, such as to change settings, read data, input data, enable or disable functionality, etc.

Figure 1A:
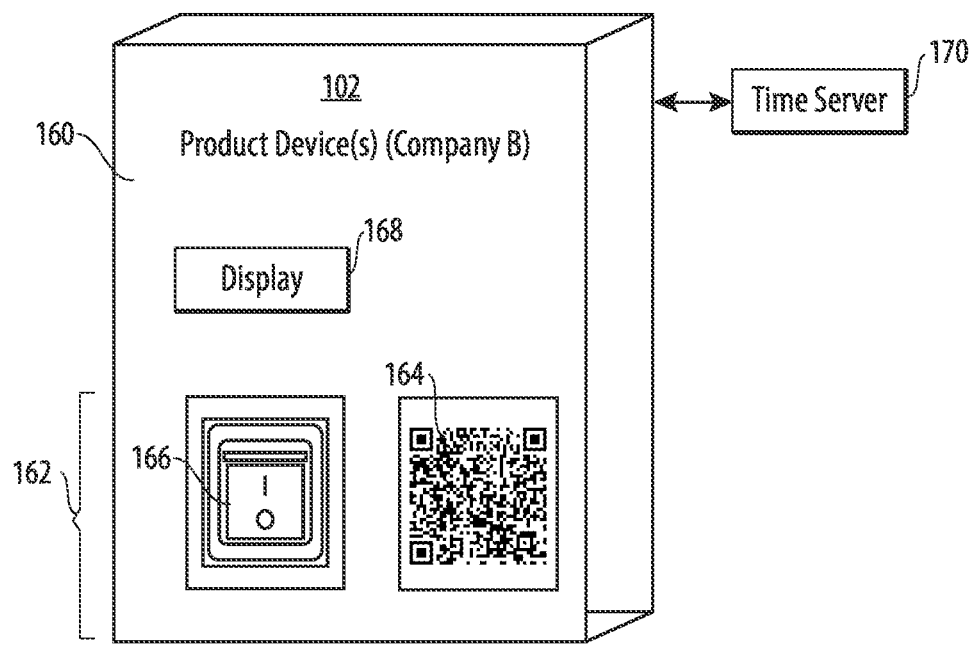
FIG. 1A is a schematic diagram of a product device having a physical proximity validator, in accordance with one or more embodiments of the disclosure.

Additionally and optionally, as shown in FIG. 1A, product device(s) 102 can be provided with one or more physical proximity validators 162. As shown, the proximity validator(s) 162 can include, for example and without limitation, an optical code 164. The optical code can be affixed or embedded, etc. on a visible surface 160 of product device 102 (e.g., an outer surface 162), such as by using a label or the like. The optical code 164 (e.g., a QR-code or the like) can store information. In addition, this information is not stored digitally by the product device 102. In another example, the proximity validator(s) 162 can include a physical device 166 (e.g., a switch, biometric sensor, or the like) that can be physically operated by the user only when the user is physically proximate the product device 102. The user can physically operate physical device 166, for example by physically manipulating or activating physical device 166, or physically providing input (e.g., biometric input) to physical device 166. FIG. 1A further shows a display 168 that can be used to display information such as an optical code to a user that is physically proximate product device 102, wherein the information is not otherwise available to any connected user that is remote from product device 102. The information that is displayed is not accessible to I/O interface(s) 138. Display 168 can be a human machine interface (HMI).

Product device 102 can also access a time server 170 or internal clock 156 to obtain a timestamp or to verify a timestamped magic password.

With returned reference to FIG. 1, server 106 is a computing device that is configured to handle registrations via a registration process for one or more product devices 102 and one or more users, receive password reset requests from a user via user device(s) 104 to reset a password for accessing a product device 102, generate a signed temporary password for the product device 102 using a combination of unique data provided during the registration about the product device 102 and/or a user or corresponding user device 104 that is signed using a cryptographic technique. During the registration process registration data including unique data about product device(s) 102 (e.g., serial number, international mobile equipment identity (IMEI), etc., without limitation to specific data) and user(s) and/or corresponding user devices 102 authorized per product device 102 to use the product device 102 (e.g., employee ID or IMEI of the user device 104) is stored in registration database 108. Registration database 108 is accessible to server 106, e.g., via a network (which can be included in network(s) 120) or can be integrated with server 106.

Registration database 108 includes a storage device that stores registration data, such as at a customer account site, about one or more users and/or user devices 102 used by the user(s) and registration data about the product device(s) 102. An association is stored to indicate which users or corresponding user devices 104 are registered to access each of the product devices 102. The number of users and/or user devices 102 and/or the number of product devices 102 for which registration data is stored can become very large, such as hundreds or hundreds of thousands or more. Network(s) 120 can include one or more enterprise and/or a public networks, such as the Internet. User device(s) 104 can communicate with server 106 via network(s) 120 using the one or more enterprise and/or public networks. The enterprise network can be secured for devices and users that are authorized to use the enterprise network, but can have a different security policy than intranet 122, such as no requirement of an air gap.

Provision of the unique data about each product device 102 to server 106 can be performed manually, such as by an administrator entering registration data for each product device 102 that is registered, or by a customer that purchased the product device 106 and has proceeded to register the product device 102 with server 106.

In one example scenario, server 106 can belong to an enterprise, such as a Company X that manufactures and/or sells product device(s) 102. The product device(s) 102 and the secure intranet 122 can belong to a different enterprise, such as Company 1 or Company N. In another scenario, server 106 can belong to an enterprise that owns and/or controls the secured intranet 122 to which the product device(s) 102 are coupled (e.g., Company X owns or includes Companies 1 and N). The administrator of server 106 or product device(s) 102 or users operating user devices 104 can perform the registration.

In one or more embodiments, the registration process for registering product device(s) 102 can be performed automatically or semi-automatically. For example, one or more edge device(s) 110 can be provided, wherein individual edge devices 110 can be configured to detect product devices 102 that have coupled to the edge device 110, collect t data from the respective product devices 102, and assist with (meaning semi-automatically) or perform (meaning automatically) the registration process with server 106 by providing the collected data to server 106. The collected data can include unique user data per product device 102 and unique user data stored by the product device 102. Edge device 110 can be a controller, such as a programmable logic controller (PLC), microcontroller, etc. Edge device 110 can also be included among the product-devices 102, and can be already registered with server 106.

The individual edge devices 110 can package the collected data in preparation of providing it to server 106. In one or more embodiments, an individual edge device 110 can initiate the registration process after detecting product device(s) 102 or can respond to a request from server 106. In one or more embodiments the registration process can be initiated via requests from server 106 to the particular edge device 110 for new registration data. The requests can be provided at predetermined intervals to one or more edge devices 110 or can be in response to an event.

Each user and/or a corresponding user device 104 needs to register with each product device 102 the user or user device 104 intends to access by providing unique user data for the user and/or corresponding user device 104. The unique user data is stored by the product device 106. Registration of, the user and/or corresponding user device 104 with the product device 102 can be required before the user and/or corresponding user device 104 are permitted (authorized) to access product device 102.

In addition, the user and/or corresponding user device 104 needs to be registered with server 106 in association with each product device 102 to be used by the user or corresponding user device 102. This results in server 106 storing unique user data for the user and/or corresponding user device 104 in association with unique product data for each product device 102 with which the user and/or user device 104 is registered.

Following registration of a particular product device 102 and a particular user or user device 104 with server 104, the user can submit a password reset request via user device 104 to server 106 to reset a password for accessing the product device 102. The password reset request identifies the user and/or user device 104 and the product device 102. Server 106 accesses registration information stored in registration database 108 to assure that the user or corresponding user device 104 is associated with the product device 102 and to access the user or corresponding user device's unique user data and the product device 102's unique product data.

Server 106 combines the unique user data and unique product data and signs it using a cryptographic key (e.g., a private key) that corresponds to a cryptographic key (e.g., a public key for server 106) that is stored by the product device 102.

In one or more embodiments, I cryptographic keys stored by server 106 and the product device 102 are asymmetric. This allows a private key to be kept in a secure environment, such as an environment controlled by a manufacturer or distributer, without the need to secure a private key on product devices 102. In other embodiments, symmetric cryptographic keys can be stored by server 106 and product device 102. The signed combined data is provided to the user as a temporary password. Transmission of the signed temporary password can use public networks due to the cryptographic technique applied for signing the temporary password.

In addition, a unique technique can be used by server 106 for combining the unique user data and unique product data, which adds security to the signed temporary password. The product device 102 that receives the signed temporary password is informed of the combining technique before transmission of the temporary password or by information included with the temporary password.

In an example scenario, server 106 belongs to a server enterprise (such as Company X) and services product devices 102 for different client enterprises (such as companies 1-N) that are clients of Company X. Each product device 102 stores a public server cryptographic key that corresponds to a signing cryptographic key (e.g., a private key) used by server 106 for signing. The server and signing cryptographic keys form a key set. A different key set can be used for each respective client 1-N. Thus server 106 can have different signing cryptographic keys 1-N for each of key sets 1-N. Product devices 102 of each of clients 1-N can store a different server cryptographic key that belongs to the appropriate key set for that client of key sets 1-N.

In another example scenario, server 106 and all product devices 102 can belong to the same enterprise and use the same key set. In still another example scenario, server 106 and all product devices 102 can belong to the same enterprise, but different key sets can be used for different product devices 102 and/or groups of product devices.

Figure 2:
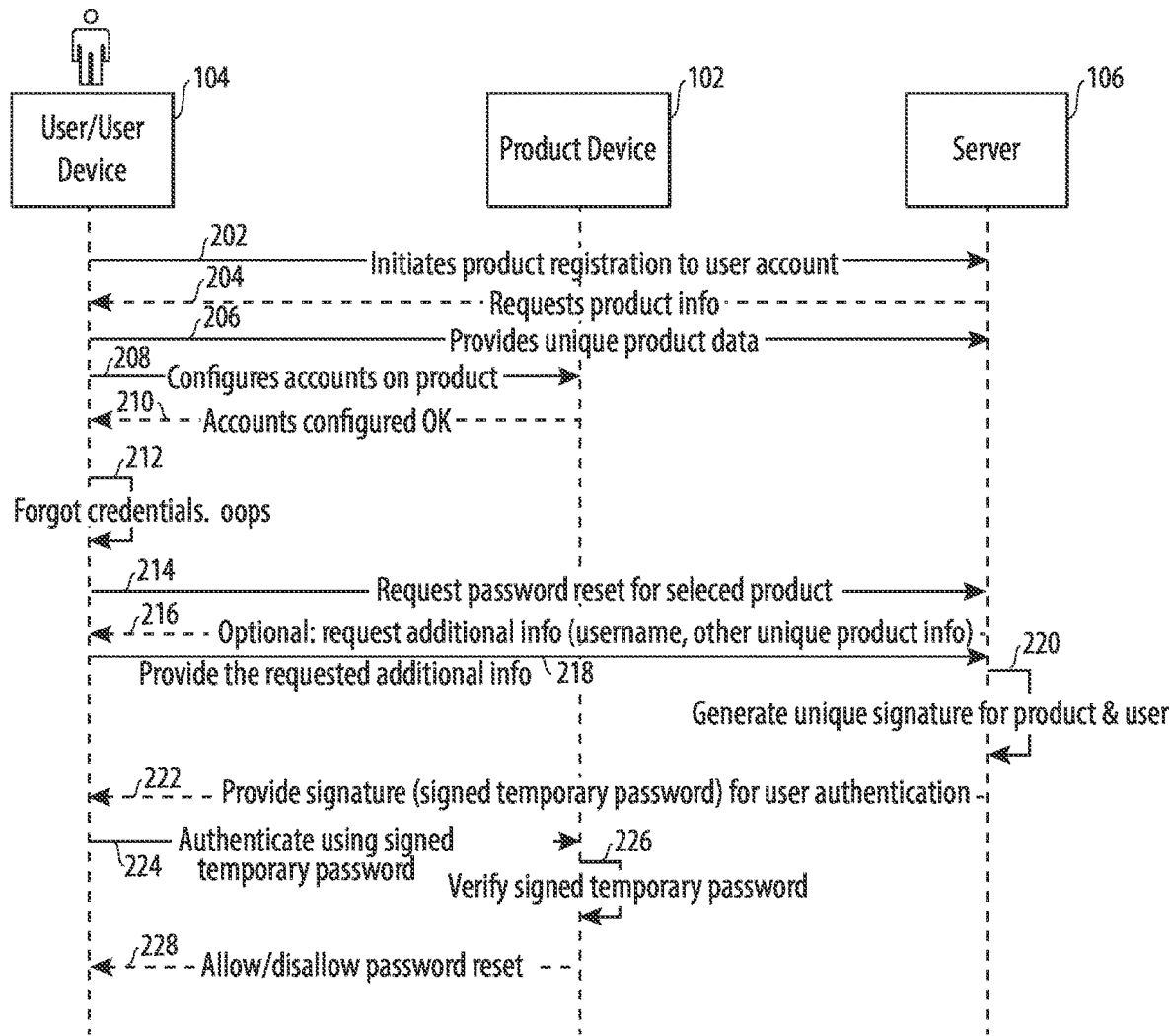
FIG. 2 is a sequence diagram showing an example method performed by password reset system, in accordance with one or more embodiments of the disclosure.
Figure 3:
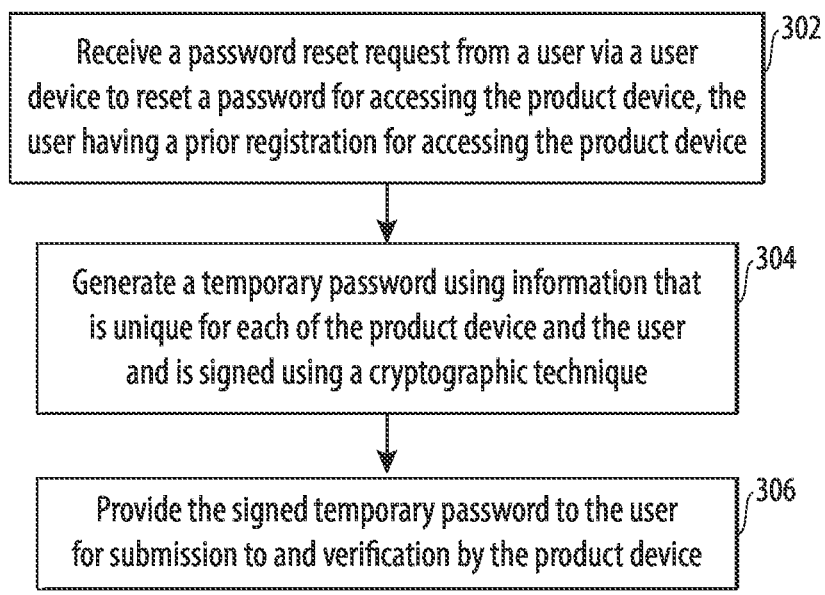
FIG. 3 is a flowchart showing an example method performed by a server of the password reset system, in accordance with one or more embodiments of the disclosure.
Figure 4:
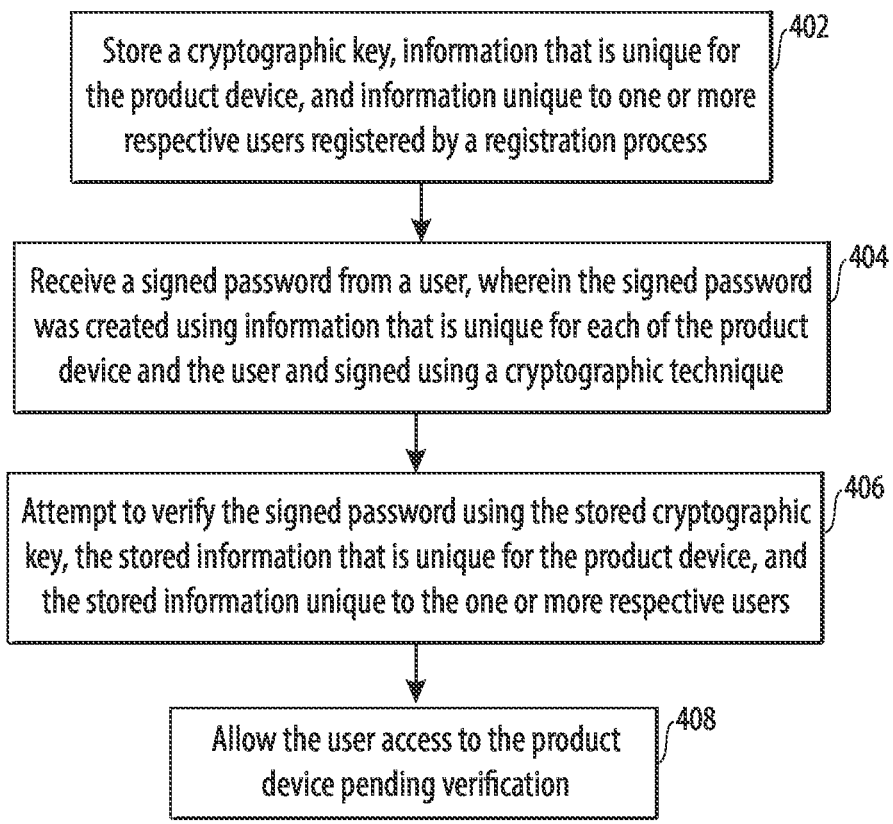
FIG. 4 is a flowchart showing an example method performed by a product device of the password reset system, in accordance with one or more embodiments of the disclosure.

With reference now to FIGS. 2-4, shown are a sequence diagram and flowcharts demonstrating implementation of the various exemplary embodiments. It is noted that the order of operations shown in FIGS. 2-4 is not required, so in principle, the various operations may be performed out of the illustrated order. Also certain operations may be skipped, different operations may be added or substituted, some operations may be performed in parallel instead of strictly sequentially, or selected operations or groups of operations may be performed in a separate application following the embodiments described herein.

With reference to FIGS. 1 and 2, a sequence diagram is shown that illustrates an example method of resetting a password in a product device 104. Solid arrows are used to show operations that originate at user device 104, whereas dotted arrows are used to show operations that terminate at the user device 104.

The method begins with registration of a particular product device 104. In the example method shown, the user has previously registered with server 106, resulting in server 106 having a user account for the user. At operation 202, using his/her user account, the user, via user device 104, initiates a registration process with server 106 to register the product device 102 with server 106 in association with his/her user account. At operation 204, server 106 requests or waits for product information for the product device 102. At operation 206, user device 104 provides unique product data for the product device 102. Server 106 can store the unique product data in association with the user's account as registration data, such as in registration database 108.

At operation 208, the user, via user device 104, initiates a registration process with product device 102 to configure an account for the user on the product device 102 for the user and/or the particular user device 104 being used. In addition to operation 208, product device 102 is configured by accessing 132 processor (e.g., an embedded controller) for storing unique product data with unique data storage 152 and public server key 154.

At operation 210, product device 102 indicates to user device 104 that the user account has been successfully configured. Operations 202-210 can be performed using conventional techniques and can be performed in a variety of orders, such as by performing registration with server 106 and with product device 102 in a different order or at substantially the same time. As previously submitted, in one or more embodiments, an edge device 110 can perform the process for registering product device 102 with server 106 automatically.

At operation 212, the user desires obtaining access to product device 102, but realizes that the password for accessing product device 102 is not available (e.g., it was forgotten, lost, corrupted, or the user is using a user device 104 that is not recognized). At operation 214, the user, via user device 104, submits a password reset request to server 106 to reset the password. The password reset request can be submitted, for example, by the user logging onto his/her account managed by server 106 and selecting the particular product device 102 for which the password reset is requested. In another example, the user can submit a password reset request that includes information needed by the server 106 to identify the product device 102.

In one or more embodiments, operations 216 and 218 can optionally be included with the method. At operation 216, additional information is requested to be provided by user device 104. Some examples of additional information include username or user biometric data, additional unique information about the product, evidence that the user is physically proximate to the product, and/or evidence of a state of operation of the product device. At operation 218, the requested additional unique information is provided.

At operation 220, server 106 generates a temporary password that combines the unique product data with some unique user data about the user that was provided via the registration process and/or at operation 218. Furthermore, server 106 signs the combined data using a cryptographic technique. The cryptographic technique can be, for example, public key infrastructure (PKI), pretty good privacy (PGP) or the equivalent. At block 222, server 106 provides the signed temporary password to user device 104 in order that the user can use the signed temporary password to be authenticated for resetting the password. Since the signed temporary password is signed using a cryptographic technique it can be sent to user device 104 via network(s) 120 using public networks.

The temporary password, upon receipt by user device 104, can be displayed by user device 104 or otherwise communicated to the user. At block 224, the signed temporary password is entered by the user into product device 102, such as via user interface 136 of product device 102. This, in effect, is a request by the user to temporarily reset the current password of the product device 102 with the temporary password.

At block 226, product device 102 applies a verification process to verify the signed temporary password. Product device 102 decrypts the signed temporary password using its stored public server key 154. Product device 102 creates a local temporary password and compares it to the decrypted temporary password. The local temporary password is created by retrieving and combining the unique user data and unique product data from its stored unique data storage 152. Product device 102 is programmed to use the same combining technique as was used by server 106. If the decrypted temporary password matches the local temporary password, the signed temporary password is verified and the requested access or password reset is authorized. If the decrypted temporary password does not match the local temporary password, verification fails and the requested access or password reset is denied.

At operation 228, product device 102 is placed in condition to be temporarily accessed by the user and/or to have its password reset if the verification at operation 226 was successful, else access to use product device 102 or reset the password is denied. In one or more embodiments, the success or failure of the verification process at operation 226 can be communicated to the user or user device, such as by displaying information on user interface 136, by activating a visual or audio indicator (not shown), or by sending a signal via I/O interface 138. It is noted, that following the user being provided with temporary access via the temporary password, if the user was not provided with the opportunity to reset the current password which existed before the temporary password was entered at block 224, or otherwise did not reset the current password, the temporary password will expire after the current session ends. The current session can end, for example, responsive to occurrence of a timeout condition or a user logout.

Operations 220 and/or operation 226 may be performed conditionally upon satisfaction of a condition that verifies that the user is physically proximate product device 102. In a first example, the user provides particular information, e.g., information that would not be known to an unauthorized user or malicious user. For example, the additional information provided at operation 218 can be determined by physically scanning (e.g., by using an optical code scanner) an optical code (e.g., optical code 164 shown in FIG. 1A). The optical code can be a QR code, or the like, that includes the additional information. The optical code can be based on product-unique data (e.g., serial number or the like) stored by product device 102. This product-unique data can be generated and provided to product device 102 at time of manufacture of device product 102, for example. The product-unique data is also stored by registration database 108 in association with the particular product device 102.

The product-unique code can be accessible to the user via an optical code provided on a visible surface of product device 102 (e.g., on a label affixed to product device 102 or the equivalent). Additionally, the product-unique data and optical code are not digitally stored by product device's 102 internal memory. In this way, at operation 220, server 106 would be able to verify that the user has physical access to product device 102 based on receipt from the user of the additional information having the product-unique code obtained from the optical code. The verification can include a comparison of the received additional information by server 106 to the product-unique data stored for the product device 102 in registration database 108. A non-authenticated user, such as a potential hacker, who only has remote access to product device 102 would be precluded from knowing the product-unique code provided by the optical code, thwarting their ability to be verified at operation 220 by server 106.

In one or more embodiments, the optical code (or other forms of the additional information) can be displayed (e.g., on display 138), but is not otherwise made available by product device 102 to any connected user. The additional information or optical code may be stored by memory 134, such as at a time of manufacturing. The optical code is displayed on the display, but in order to prevent the optical code from being shared with a remote user the optical code is not provided to any other I/O interfaces 138. In this way, the optical code is shared only by displaying it visually on the product device 102's display in response to a password reset request. This verifies that the user that obtained the additional information from the optical code is physically proximate to product device 102.

In another example, the user can physically operate a physical device (e.g., physical device 166 shown in FIG. 1A) on product device 102. Physical operation of the physical device can cause product device 102 to enter a particular state. Product device 102 can recognize its state and decide, based on the recognized state, whether to perform operation 226.

In another example, physical operation of the physical device can cause product device 102 to submit data or a signal to server 106, Upon receipt of this data or signal, server 106 would be able to verify at operation 220 that the user has physical access to product device 102.

In one or more embodiments, product device 102 can display the optical code adjusted with a time-limiting component. For example, a time server (such as time server 170) coupled to product device 102 can generate a current timestamp. The time server or product device 102 can apply a hash algorithm, using the timestamp, to convert the product-unique code stored by product device 102 into a fixed-length timestamped version of the product-unique code, and display the timestamped hashed product-unique code as the optical code. A physically-proximate user can scan the optical code to obtain the timestamped hashed product-unique code and submit it to server 106 at operation 218. Server 106 can receive and convert the timestamped hashed product-unique code into the product-unique code and the timestamp. Verification by server 106 at operation 220 can be based on verification of the product-unique code and a determination that the timestamp has not expired. In this way, a malicious user would not be able to record and re-use a timestamped hashed product-unique code at a different time, since the timestamp would have expired.

In one or embodiments, the signed temporary password provided at operation 222 can expire within a predefined time window. For example, the password reset request submitted by the user at operation 214 can be timestamped by server 106 upon receipt. The timestamp (or an updated timestamp) can be included with the signed temporary password provided by server 106 at operation 222. Verification of the signed temporary password by product device 102 at operation 226 can include verification that the current time is within the predefined time window of the timestamp included with the signed temporary password. Product device 102 can access an internal clock or the time server to obtain the current time.

In one or more embodiments, product device 102 may be air gapped from public networks. In this case, access to product device 102, e.g., at operations 208, 210, 224, and 228 can be performed using a technique to bridge the air gap.

With reference to FIG. 3, a flowchart is shown of an example method performed by a server such as server 106 shown in FIG. 1. The method includes, at block 302, receiving a password reset request from a user via a user device to reset a password for accessing a product device, such as product device 102 shown in FIG. 1. The user has previously registered with the product device for accessing the product device. The method further includes, at block 304, generating a temporary password that uses information that is unique for each of the product device and the user and is signed using a cryptographic technique. The method further includes, at block 306, providing the signed temporary password to the user for submission to and verification by the product device. The product device is configured to verify the signed temporary password using the cryptographic technique and using information that is unique for each of the product device and the user and that is known to the product device, and to allow the user access to the product device pending verification.

In one or more embodiments, the signature can be generated conditional upon receiving additional information. The additional information establishes that the user has physical access to the product device, the additional information includes data related to the product device that is currently digitally unavailable to the product device, the additional information includes data related to the product device that is currently digitally unavailable to the product device other than for temporary display, the additional information includes data related to the product device that is controlled by the manufacturer, and/or the additional information is set to expire within a predetermined time period.

In one or more embodiments, the method further includes obtaining and storing the information that is unique to the product device and the information that is unique to the user during the prior registration. This stored information that is unique to the product device and the information that is unique to the user can be accessed for generating the signed temporary password using data in the password reset request that identifies the user and the product device.

In one or more embodiments, the method can further include coupling to a network and automatically registering the product device when it is coupled to a component that is connected to the network.

With reference to FIG. 4, a flowchart is shown of an example method performed by a product device, such as product device 102 shown in FIG. 1. The method includes, at block 402, storing a cryptographic key, information that is unique for the product device, and information unique to one or more respective users registered by a registration process as being authorized to access the product device. The method includes, at block 404, receiving a signed password from a user, wherein the signed password was created using information that is unique for each of the product device and the user and signed using a cryptographic technique. The method includes, at block 406, attempting to verify the signed password using the stored cryptographic key, the stored information that is unique for the product device, and the stored information unique to the one or more respective users. The method includes, at block 408, allowing the user to access to the product device pending verification.

In one or more embodiments, the method can further include coupling to a component that is coupled to a network and providing registration information to the component for registering the product device using the registration process. The registration information includes information that is unique for the product device.

In one or more embodiments, attempting to verify the signed password and/or allowing the user access to the product device are performed conditional upon the product device being in a predefined state.

In one or more embodiments, the signed password is provided conditional upon verification of additional information, wherein the additional information establishes that the user has physical access to the product device, the product device is unable to access the additional information at all, the product device is unable to access the additional information other than for temporary display, and/or the additional information is set to expire within a predetermined time period.

Potential advantages gained by the disclosed password reset system 100 include provision of a convenient and secure solution in which, provided a user and/or corresponding user device and a product device are registered with a server, the user can send a password reset request to the server for a password reset and receive a signed temporary password from the server, which the user can enter on the product device for resetting the product device's password. The password reset can be performed even when the product device wherein the product device is inaccessible via a public network or access to the public network requires bridging an air gap. For security purposes, the product device does not need to permanently store a long-term recovery mechanism or be provided with a backdoor for performing a password reset. Security can be further enhanced by requiring evidence of the user's physical proximity to the product device and/or requiring additional credentials from the user when submitting a password reset request to the server or product device.

With reference to FIG. 5, a block diagram of an example computing system 500 is shown, which provides an example configuration for implementation of each of user device 104, server 106, and product device 102 (including its components, e.g., processor 132, memory 134, user interface 136, I/O interface 138, and/or bus 140) shown in FIG. 1. User device 104, server 106, and product device 102 and its components could each be configured as software, firmware, or hardware, and computing system 500 could represent such portions. Computing system 500 is only one example of a suitable system and is not intended to suggest any limitation as to the scope of use or functionality of embodiments of the disclosure described herein. Computing system 500 can be implemented using hardware, software, and/or firmware. Regardless, computing system 500 is capable of being implemented and/or performing functionality as set forth in the disclosure.

Computing system 500 is shown in the form of a general-purpose computing device. Computing system 500 includes a processing device 502, memory 504, an input/output (I/O) interface (I/F) 506, and user interface 510, and can optionally communicate with an external component 508.

The processing device 502 can include, for example, a programmable logic device (PLD), microprocessor, DSP, a microcontroller, an FPGA, an ASIC, and/or other discrete or integrated logic circuitry having similar processing capabilities.

The processing device 502 and the memory 504 can be included in components provided in the FPGA, ASIC, microcontroller, or microprocessor, for example. Memory 504 can include, for example, volatile and non-volatile memory for storing data temporarily or long term, and for storing programmable instructions executable by the processing device 502. Memory 504 can be a removable (e.g., portable) memory for storage of program instructions. I/O I/F 506 can include an interface and/or conductors to couple to the one or more internal components and/or external components 508.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the block diagram block or blocks.

Embodiments of user device 104, server 106, and product device 102 may be implemented or executed by one or more computer systems, such as a microprocessor. Each computer system 500 can be included within processing components of each of user device 104, server 106, and product device 102, or multiple instances thereof. The computer system 500 can be provided as an embedded device.

Computer system 500 is only one example of a suitable system and is not intended to suggest any limitation as to the scope of use or functionality of embodiments of the disclosure described herein. Regardless, computer system 500 is capable of being implemented and/or performing any of the functionality set forth hereinabove.

Computer system 500 may be described in the general context of computer system-executable instructions, such as program modules, being executed by a computer system. Generally, program modules may include routines, programs, objects, components, logic, data structures, and so on that perform particular tasks or implement particular abstract data types.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

We claim:

1. A method of resetting a password used for accessing a product device, the method comprising:
receiving a password reset request from a user to reset the password for accessing the product device, the user having a prior registration to access the product device;
generating a temporary password formed by combining, by a combining technique, information that is unique for each of the product device and the user and signing the combined information using a cryptographic technique; and
providing the signed temporary password to the user for submission to and verification by the product device, wherein the product device is configured to verify the signed temporary password by at least a) generating a local password using the combining technique to combine the information that is unique for each of the product device and the user that are each known to the product device, b) decrypting the signed temporary password using a cryptographic key stored by the product device, and c) comparing the local password to the decrypted temporary password, and to allow the user access to the product device pending verification.

2. The method of claim 1, wherein providing the signed temporary password is conditional upon receiving additional information, wherein the additional information establishes that the user has physical access to the product device, the additional information includes data related to the product device that is currently digitally unavailable to the product device, the additional information includes data related to the product device that is currently digitally unavailable to the product device other than for temporary display, the additional information includes data related to the product device that is controlled by a manufacturer of the product device, and/or the additional information is set to expire within a predetermined time period.

3. The method of claim 1, further comprising obtaining and storing the information that is unique to the product device and the information that is unique to the user during the prior registration and accessing the stored information that is unique to the product device and the information that is unique to the user using data in the password reset request that identifies the user and the product device.

4. The method of claim 1, wherein the combining technique is unique for the information that is unique for the product device and the information that is unique to the user that are known to the product device, and the unique combining technique that adds security to the signed temporary password.

5. A method performed by a product device for resetting a password for accessing the product device, the method comprising:
storing a cryptographic key, information that is unique for the product device, and information unique to one or more respective users registered by a registration process as being authorized to access the product device;
receiving a signed password from a user, wherein the signed password was created by combining using a combining technique information that is unique for each of the product device and the user and signing the combined information using a cryptographic technique;
attempting to verify the signed password using the stored cryptographic key, the stored information that is unique for the product device, and the stored information unique to the one or more respective users, wherein attempting to verify the signed password comprises:
generating a local password using the stored information that is unique for the product device and the stored information that is unique to the one or more respective users as combined by the combining technique;
decrypting the received signed password using the stored cryptographic key; and
comparing the local password to the decrypted signed password; and
allowing the user to access the product device pending verification.

6. The method of claim 5, wherein the product device is an industrial device and/or is inaccessible via a public network or access to the public network requires bridging an air gap.

7. The method of claim 5, wherein attempting to verify the signed password and/or allowing the user access to the product device are performed conditionally upon the product device being in a predefined state.

8. The method of claim 5, wherein the signed password is provided conditional upon verification of additional information, wherein the additional information establishes that the user has physical access to the product device, the product device is unable to access the additional information at all, the product device is unable to access the additional information other than for temporary display, and/or the additional information is set to expire within a predetermined time period.

9. The method of claim 5, further comprising receiving information identifying the combining technique, wherein the combining technique is unique for the stored information that is unique for each of the product device and the one or more respective users.

10. A server configured to perform a reset of a password used for accessing a product device, the server comprising:
a memory configured to store a plurality of programmable instructions; and
a processing device in communication with the memory, wherein the processing device, upon execution of the plurality of programmable instructions is configured to:
receive a password reset request from a user to reset a password for accessing the product device, the user having a prior registration to access the product device;
generate a temporary password formed by combining, using a combining technique, information that is unique for each of the product device and the user and signing the combined information using a cryptographic technique; and
provide the signed temporary password to the user for submission to and verification by the product device, wherein the product device is configured to verify the signed temporary password by at least a) generating a local password using the combining technique to combine the information that is unique for each of the product device and the user that are each known to the product device, b) decrypting the signed temporary password using a cryptographic key stored by the product device, and c) comparing the local password to the decrypted temporary password, and to allow the user access to the product device pending verification.

11. The server of claim 10, wherein providing the signed temporary password is conditional upon receiving additional information, wherein the additional information establishes that the user has physical access to the product device, the additional information includes data related to the product device that is currently digitally unavailable to the product device, the additional information includes data related to the product device that is currently digitally unavailable to the product device other than for temporary display, the additional information includes data related to the product device that is controlled by a manufacturer of the product device, and/or the additional information is set to expire within a predetermined time period.

12. The server of claim 10, wherein the processing device upon execution of the plurality of programmable instructions is further configured to obtain and store the information that is unique to the product device and the information that is unique to the user during the prior registration and access the stored information that is unique to the product device and the information that is unique to the user using data in the password reset request that identifies the user and the product device.

13. The server of claim 10, wherein the product device is an industrial device.

14. The server of claim 10, wherein the product device is inaccessible via a public network or access to the public network requires bridging an air gap.

15. A product device for which a password needs to be reset, the product device comprising:
   a memory configured to store a plurality of programmable instructions; and
   a processing device in communication with the memory, wherein the processing device, upon execution of the plurality of programmable instructions is configured to:
   store a cryptographic key, information that is unique for the product device, and information unique to one or more respective users registered by a registration process as being authorized to access the product device;
   receive a signed password from a user, wherein the signed password was created by combining, using a combining technique, information that is unique for each of the product device and the user and signing the combined information using a cryptographic technique;
   attempt to verify the signed password using the stored cryptographic key, the stored information that is unique for the product device, and the stored information unique to the one or more respective users, wherein attempting to verify the signed password comprises:
      generating a local password using the stored information that is unique for the product device, the stored information unique to the one or more respective users as combined by the combining technique;
      decrypting the received signed password using the stored cryptographic key; and
      comparing the local password to the decrypted signed password; and
   allow the user to access the product device pending verification.

16. The product device of claim 15, wherein the product device is an industrial device.

17. The product device of claim 15, wherein the product device is not accessible via a public network.

18. The product device of claim 15, wherein attempting to verify the signed password and/or allowing the user access to the product device are performed conditionally upon the product device being in a predefined state.

19. The product device of claim 15, wherein the signed password is provided conditional upon verification of additional information, wherein the additional information establishes that the user has physical access to the product device, the product device is unable to access the additional information at all, the product device is unable to access the additional information other than for temporary display, and/or the additional information is set to expire within a predetermined time period.

* * * * *